United States Patent

[11] 3,611,912

| [72] | Inventor | Anton Choc |
| | | 636 S. Fairfield Ave., Lambard, Ill. 60148 |
| [21] | Appl. No. | 840,760 |
| [22] | Filed | July 10, 1969 |
| [45] | Patented | Oct. 12, 1971 |

[54] PORTABLE GRILL
7 Claims, 7 Drawing Figs.

[52] U.S. Cl. .................................................. 99/339,
99/340, 99/393, 99/400, 99/421, 99/449, 99/450,
126/9, 126/25
[51] Int. Cl. ....................................................... A47j 37/04
[50] Field of Search .......................................... 99/339,
340, 393, 400, 421, 449, 450, 390, 391; 126/9 B, 25

[56] References Cited
UNITED STATES PATENTS

| 2,379,239 | 6/1945 | Krebs ........................ | 126/25 X |
| 2,477,529 | 7/1949 | Sprinkle et al. ............ | 126/9 |
| 2,515,521 | 7/1950 | Loffredo .................... | 126/9 |
| 2,565,000 | 8/1951 | Schultz ...................... | 126/9 |
| 2,718,845 | 9/1955 | Dudley ...................... | 99/421 |
| 2,923,229 | 2/1960 | Halford ..................... | 99/339 |
| 2,962,019 | 11/1960 | Lundgren ................... | 126/25 |
| 3,068,852 | 12/1962 | Purtzer ...................... | 126/25 |
| 3,182,585 | 5/1965 | Rensch et al. ............. | 99/340 |
| 3,421,433 | 1/1969 | Vitale ........................ | 99/340 |
| 3,503,324 | 3/1970 | Gmeiner ..................... | 99/393 |

FOREIGN PATENTS

| 231,482 | 12/1960 | Australia .................... | 99/390 |

Primary Examiner—Billy J. Wilhite
Attorney—Hill, Sherman, Meroni, Gross & Simpson

ABSTRACT: A portable grill comprising a hinged carrying case openable to form an elongated planar grill base or counter top, legs swingable out of the case to support the base at an elevated horizontal position, sidewall forming members fitting in the case and attachable to the top of the base to form supports for hot coal holding racks also fitting in the case and selectively mountable on the sidewalls either parallel to the base or perpendicular thereto for grilling or rotisserie operation.

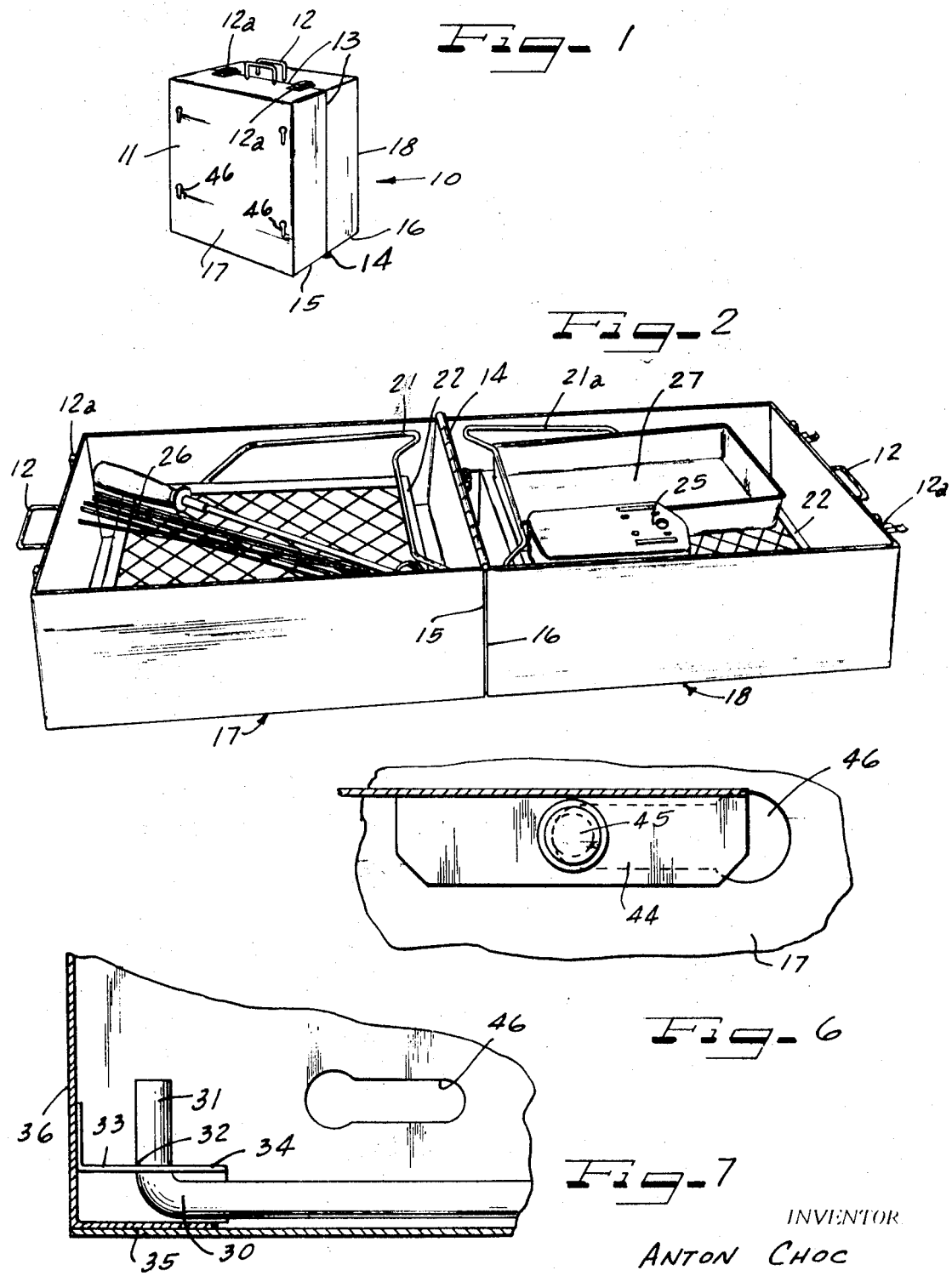

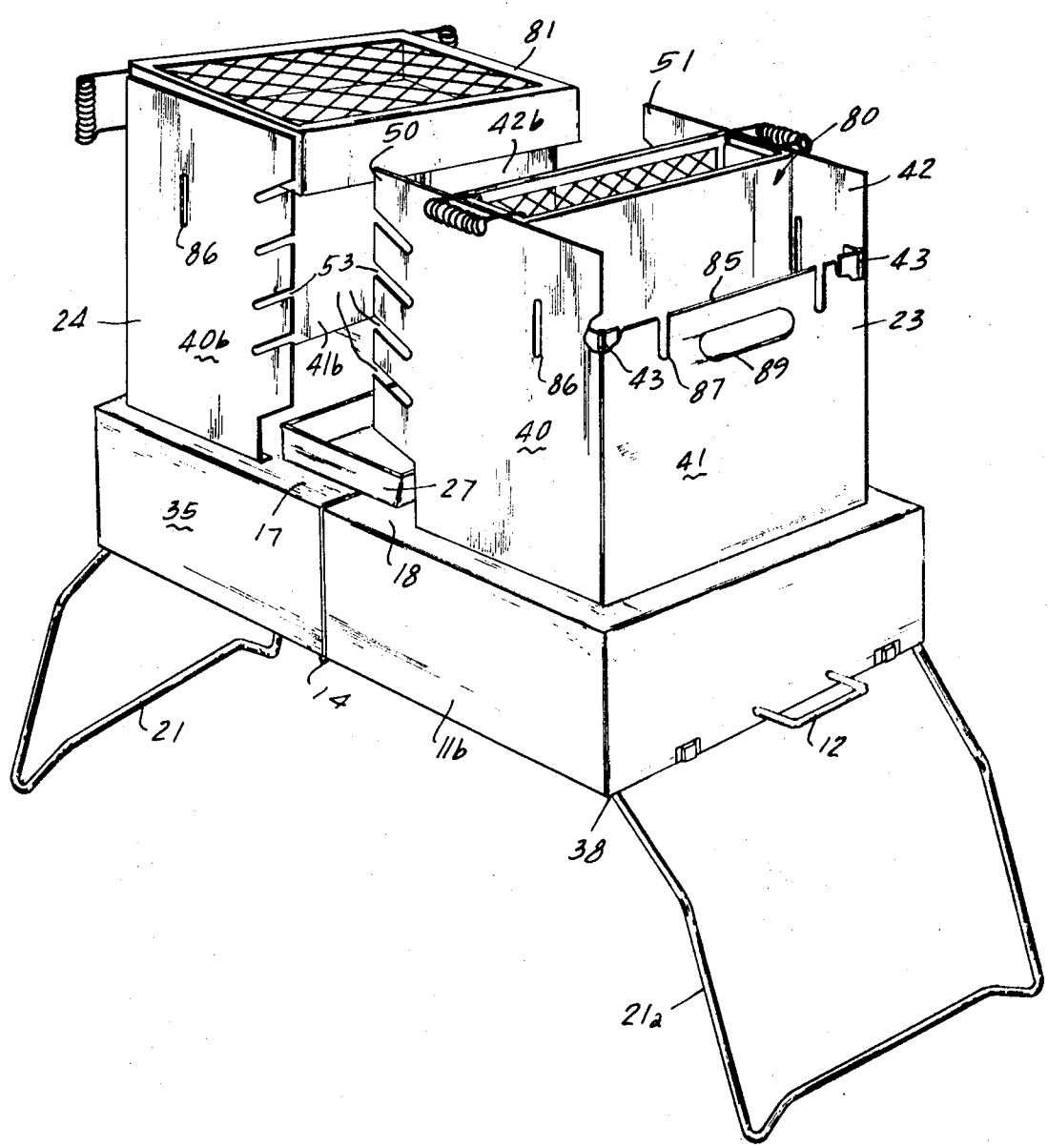

PORTABLE GRILL

BACKGROUND OF THE INVENTION

1. Field of the Invention

This invention relates to camping equipment and more particularly to a portable grill for cooking foods.

2. Prior Art

Portable barbecue grills are old in the art. Many such grills are relatively easily dismantled and come equipped with storage members which open to provide a functional grill piece. However, such prior art grills are generally adapted only for grill top cooking or for oven baking such as by enclosing the grill top. For rotisserie cooking is often advantageous to have side heat. That is, in true rue rotisserie barbecuing, it is often desirable to place the heat either to one side or the other of the cooking article. However, for foods which must be cooked in a pan or for slab meats, it is desirable to have a counter top grill. The prior art portable grills do not provide sufficient versatility which would allow both top and side cooking either exclusively or simultaneously.

SUMMARY

This invention overcomes these deficiencies by providing a portable hot coal grill which is adapted to provide either top heat or side heat and wherein the side heat is fully adjustable. The grill comprises a boxlike storage container which is transversely split and hinged along one side so as to open to provide a braced counter top. Legs may depend from the opened bottom side. The counter top has means which cooperate with lugs on the bottom of U-shaped cross section foldable sidewall members which mount atop the base in opposed channel relation.

Two charcoal holding members which consist of open-ended rectangular metal members having a grill face are adapted to be positioned on the sidewall defining members either parallel to or perpendicular to the base member. In parallel relation with the base member, they provide counter top cooking, while in perpendicular relation, they provide side heat cooking. When mounted in perpendicular fashion, the coal holding members may be slid towards and away from each other so as to vary the heat applied to food positioned in the center of the cooking area. For combination cooking, one of the members may be positioned parallel to the base while the other member is positioned perpendicularly thereto.

It is therefore an object of this invention to provide an improved portable barbecue grill.

It is a more important object of this invention to provide a collapsible portable cooking grill having grill top and side heat cooking configurations.

It is yet another object of this invention to provide a portable cooking grill constructed of collapsible members which are storable in the interior of a storage member which opens to provide a base for the assembled grill and wherein the grill may be used as a grill top cooker or as a side heat grill.

It is yet another and more important object of this invention to provide a portable hot coal barbecue grill having a storage member capable of storing within itself all of the components of the grill and which opens to form a base for the grill mounting two U-shaped sidewall defining members which act as supports for two hot coal holding racks which may be disposed either parallel to or perpendicular to the base member for supplying heat either as a grill top unit or as a side heat unit.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a perspective view of the portable grill of this invention in its stored closed position.

FIG. 2 is a perspective view of the portable grill of this invention illustrating the storage member open with the remaining components packed therein.

FIG. 3 is a perspective view of the portable grill of this invention in its assembled cooking position.

FIG. 6 (on page 1) is a fragmental plan view of an attachment member for the sidewall members of this invention.

FIG. 7 (on page 1) is a fragmental plan view of an attachment member for the base legs.

DESCRIPTION OF THE PREFERRED EMBODIMENT

Figure 4:
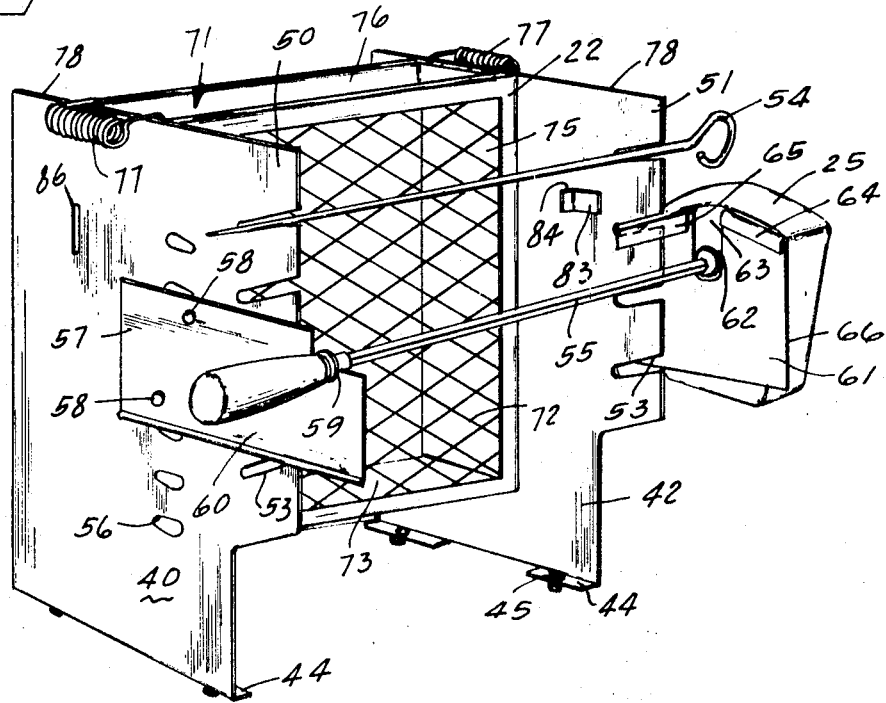
FIG. 4 is a perspective view of the sidewall member, hot coal holder and rotisserie of the portable grill of this invention.

FIG. 1 is a perspective view of the portable grill 10 of my invention as fully packed for portability. The grill 10 consists of a storage member or casing 11 having carrying handles 12 thereon. The storage member 11 is a six-sided rectangular case which is split as at 13 into two equal halves which are joined together by a hinge 14 along the bottom and folded into abutting relation in the closed position with latches 12a adjacent the handles 12. The storage member 11 has a large hollow interior.

The storage member 11 is hinged so that when it is opened, the sidewalls 15 and 16 adjacent the hinge abut each other to form a stabilized semirigid platform or table with the top 17 and bottom 18 in side-by-side coplanar relation. The top 17 and bottom 18 of the storage member 11 comprise a top surface 20 upon which the remainder of the grill is assembled. The storage member when open functions as a base member 11b for the grill.

FIG. 2 illustrates the interior of the storage member as opened. All of the components of the grill are stored within the storage member including the legs 21, hot coal holders 22, sidewall members 23 and 24, rotisserie motor 25, skewers and other cooking implements 26 and drip pan 27.

The legs 21 and 21a are substantially U-shaped bent wire rod members which are hinged adjacent the sidewalls opposite the hinge 14. As illustrated in FIG. 6, the end portion 30 of each leg is bent with an inwardly extending portion 31 which is received through an opening 32 in a bracket 33. The bracket 33 has a wall 34 parallel to and spaced from the longitudinal side 35 of the member 11. The bracket 33 is attached to the end 36 and to the underside of the top 20 of the base member 11b as by welding or the like attachment means. The end portion 30 of the leg projects into the space between the side 35 and the bracket 34 and then is bent away from the side 35 and passes through the opening 32. In this manner, the leg is firmly retained in the bracket. Preferably the portion 31 extends a distance greater than the space between the bracket wall 34 and the wall 35 so that it will not fall out.

As illustrated in FIG. 3, when fully opened the legs 21 and 21a extend beyond the ends of the base member 11b and support it by abutment with the bottom edge 38 of the member 11b. Thus, when the member 11 is open and the legs extended to form the base member 11b, a rigid self-standing base is provided for the remainder of the grill.

The two sidewall forming members 23 and 24 mount atop the base member 11b. As best illustrated in FIGS. 3 and 4, the sidewall defining members consist of three panels 40, 41 and 42 which are hinged together along their edges into a U-shaped member as at 43. The parallel walls 40 and 42 are slightly taller than the wall 41. The wall 41 is the end wall and faces the wall 41b of the other member which is positioned at the opposite end of the top 20 of the base member 11b. The walls 40 and 42 are hinged to the wall 41 in such a manner that they may be folded inwardly upon each other. In this manner, the members 23 and 24 may be folded flat for storage within the member 11.

As illustrated in FIGS. 4 and 6, the sidewalls 40 and 42 have inturned flange tabs 44 at the bottom. The tabs 44 have headed rivetlike members 45 projecting downwardly therefrom which index with keyhole slots 46 in the top 20 of the base 11b. This indexing both spaces the members 23 and 24 and provides for a rigid upright position thereof on the base 11b.

The underside heads of the rivetlike members 45 are spaced from the tabs 44 a distance approximately equal to the thickness of the top 20 of the member 11b. In this manner, the wall forming members 23 and 24 are firmly mounted on top of the base member 11b.

The free edges 50 and 51 of the sidewalls 40 and 42 opposite the hinged edges have a plurality of downward slanting slots 53 therein. The edges 50 and 51 of the members 23 and 24 are spaced from each other with the slots 53 facing one another. The slots 53 act as holders for skewers such as the skewer 54 illustrated in FIG. 4. When it is desired to use a rotisserie skewer such as the skewer 55, brackets may be utilized to span the distance between the member 23 and the member 24 so that the skewer 55 may be centrally located. In one embodiment, a series of teardrop shaped holes 56 are formed in the walls 40 and 42. The narrow end of the holes 56 towards the bottom of the wall face the opposite direction of the narrow end of the holes 56 towards the top of the wall. A bracket 57 has two spaced-apart headed members 58 projecting from one side thereof. The members 58 are spaced on the bracket 57 such that the upper member 58 is both above an forward of the lower headed member. In this manner, with the headed members 58 received in the teardrop holes 56, the bracket 57 will be positioned parallel to the top 20 of the base 11b. The holes 56 are spaced with respect to the members 58 such that when the top member 58 is in the bottommost hole 56 which has the narrow portion of the teardrop shaped hole facing towards the center of the grill, then the bottom member 58 will be in the bottom hole 56 which has the narrow portion facing towards the end of the grill. This allows for height adjustability of the skewer 56 which is mounted in a groove 59 in the projecting end 60 of the bracket 57 which projects beyond the edge 50.

FIG. 4 also illustrates a different type of bracket 61. This bracket is preferably formed from a bent piece of sheet metal and has a central slot 62 extending downwardly from the top 63 in the center thereof. The top 63 tapers downwardly on both sides from the center and has folded-over flanges 64 and 65 extending from the slot 62 to the outside edges 66. The folded-over flanges 64 and 65 have the same taper as the top and are dimensioned to mate with the slots 53 in the sidewall forming members 23 and 24 such that the bracket 61 can be attached to the sidewalls by slipping the flanges into one of the slots with the folded-over portion on one side of the sidewall and the main portion of the bracket on the other side of the sidewall so that the sidewall is entrapped between the flange and the bracket. The flange 64 will be attached to one of the members 23 with the flange 65 attached to the other member 24. This not only attaches the bracket 61 to the outside of the sidewall forming members, but locks the members together to provide a more rigid structure.

The bracket 61 can also carry fastenings on the outside thereof for mounting a rotisserie motor 25. The rotisserie skewer 55 is then received in the slots 63.

The brackets 57 and the bracket 61 may be used alternatively or together. That is to say that a set of brackets can be wither one bracket 57 and one bracket such as the bracket 61 or may be two of either. In those cases where brackets such as the bracket 61 are used, it is necessary to provide the teardrop shaped holes 56.

Figure 5:
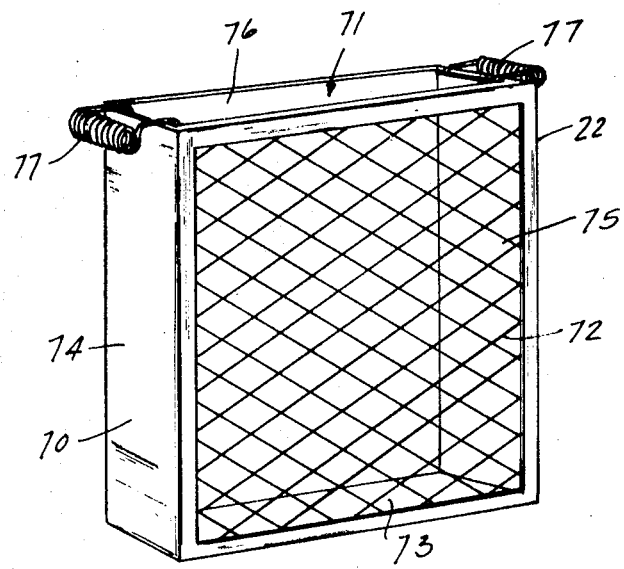
FIG. 5 is a perspective view of one of the hot coal holders of this invention.

In the portable grill of my invention, cooking is done with heat derived from burning charcoal, wood chips or the like, which are retained in hot coals holders 22. One of the holders 22 is illustrated in FIG. 5. The holder consists basically of a six-sided rectangular box 70 with an open end 71 and a grilled front 72. The end 71, the end 73 and the sidewalls 74 and 75 are narrow with respect to the backwall 76 and the grilled front wall 72. The front wall 72 may consist of a wire mesh as illustrated or a series of bars or the like which will aid in retaining the coals within the member 22 while at the same time allowing heat to pass outwardly and, when in a flat position, allow grease to drip. Handles 77 extend outwardly away from the sides 74 and 75 from the open end 71. The handles are illustrated as being coiled wire to act as effective heat dissipators. The open end 71 provides ease of filling and emptying the holder or tray 22.

As illustrated in FIG. 4, the hot coal holding members 22 may be hung from the top edges 78 of the sidewalls 40 and 42 of the sidewall forming members 23 and 24 by the handles 77. When so hung, the sidewall forming members the bottom of the hot coal holding members are dimensioned so that the bottom wall 73 of the member 22 is spaced from the bottom of the sidewall forming members. Thus, when hung perpendicular to the base member 11b as illustrated at 80 in FIG. 3, the bottom wall 73 is spaced from the top 20 of the member 11b. The hot coal holding member 22 can be slid along the top edge 78 of the sidewalls towards and away from the center of the grill. When the member 22 is filled with hot coals, this provides a means for adjusting the heat at the center of the grill for rotisserie or skewer side heat grilling.

Both of the hot coal holding members 22 can be disposed perpendicular to the top 20 of the base member 11b from the sidewall forming members 23 and 24 to provide heat on both sides of the center. With both hot coal holding members or trays positioned in the perpendicular attitude, the grease pan 27 can be placed on the top 20 of the base 11b to catch drippings from food being cooked in the center area between the trays. This provides a health feature in that the dripped grease does not fall into the coals. Alternatively, one or both of the hot coal holding members 22 may be disposed parallel to the top 20 of the base member 11b for counter or grill top cooking as illustrated at 81 on FIG. 3.

The sidewalls 40 and 42 of the sidewall forming members 23 and 24 have positioned thereon outward extending tangs 83 adjacent the edges 51. The top 84 of the tangs 83 lies in the same plane as the top edge 85 of the end wall 41. Thus, the hot coal holding members 22 can be laid parallel to the top 20 of the member 11b with the backwall 76 supported by the top edge 85 of the end wall 41 and by the top edges 84 of the tangs 83.

Slots 86 and 87 are provided in the sidewalls 40 and 42 and the backwall 41 of the side forming members 23 and 24 through which the tangs 83 can project when the sidewall forming member is folded along the hinges to lie flat for storage. Additional finger slots 89 may be provided in the end walls 41 for lifting the grill in its assembled form.

It can therefore be seen from the above that my invention provides for a portable grill which is easily assembled and disassembled and in which all of the components can be stored in a storage member which opens to provide a legged base member upon which the remainder of the grill is assembled. The grill in its assembled position provides for both counter top and rotisserie side heat grilling with fully adjustable side heat temperatures, the hot coals being retained in individual coal holding members which are suspended above the base either parallel or perpendicularly thereto by grill sidewall forming members. THe resultant grill is efficient, versatile, and economical to manufacture and operate.

Although the teachings of my invention have herein been discussed with reference to specific theories and embodiments, it is to be understood that these are by way of illustration only and that others may wish to utilize my invention in different designs or applications.

I claim as my invention:

1. A portable grill comprising: a storage member having a top and a bottom and a hollow interior, said storage member openable to form a base member with said top and bottom in side-by-side coplanar relation forming the top of the base member, a plurality of sidewall defining members, means detachably attaching said sidewall defining members to the top of said base member, said sidewall defining members forming side and end walls of a grilling area on top of said base member, a plurality of hot coal holding members, said hot coal holding members having a solid backwall, a vented front wall spaced from the backwall and side and at least one end wall, means for detachably positioning said hot coal holding members adjacent the top of said area parallel to the said base and means for detachably positioning said holding members in said area perpendicular to said base.

2. The portable grill of claim 1 wherein the said base member has attached thereto foldable legs for positioning the said base member off of the ground and the said legs, sidewall defining members, and hot coal holding members storageable interior of said storage member.

3. A portable charcoal grill and rotisserie comprising a carrying case with hinged together halves opening into a flat base, legs carried by each half extensible from the interior of the case to support the base in an elevated horizontal position, a pair of wall units having folded-together positions fitting in the case and opened U-shaped positions, means detachably mounting the wall units upright on the base in spaced opposed relation to form two open top shields on the base with a central open gap therebetween, charcoal holding racks fitting in the case and selectively mounted horizontally or vertically on the wall units to provide flat grills or upstanding rotisserie heaters, skewer supports on the wall units facing the open gap to receive skewers between the vertically mounted racks, said racks being shiftable on said wall units toward and away from the gap to control the heating of the gap area and a drip pan fitting in the case and on the base in the gap between the opened up wall units.

4. A portable combination grill and rotisserie comprising a rigid metal carrying case having a closed compact position and an open extended table position, metal plates fitting in said base, means detachably mounting said plates in upright positions on the table to provide an opened topped rectangular chamber with a central transverse gap on the table, pair of heating racks fitting in the case and selectively mounted horizontally on the plates to cover the top of the chamber to form a flat grill top or vertically on opposite sides of the gap to form a rotisserie heating chamber therebetween, and skewer mounts on the plates to support skewers across the rotisserie heating chamber.

5. The device of claim 4 wherein the plates are two units of three hinged-together metal sheets forming U-shaped members in their opened positions.

6. The device of claim 4 including legs pivoted in the case and extensible therefrom to support the base in elevated horizontal position.

7. The device of claim 4 wherein the case is composed of two trays each with a bottom and upstanding peripheral walls abutted together in the closed case position and hinged together along one abutting edge to cooperate in the open position in face-to-face relation to stiffen the table.